US006192509B1

(12) United States Patent
Akkiraju

(10) Patent No.: US 6,192,509 B1
(45) Date of Patent: Feb. 20, 2001

(54) METHOD AND APPARATUS FOR AUTOMATICALLY REMOVING ACID TRAPS FROM A HATCHED FILL IN A PRINTED CIRCUIT BOARD DESIGN

(75) Inventor: Nataraj Akkiraju, San Jose, CA (US)

(73) Assignee: Mentor Graphics Corporation, Wilsonville, OR (US)

( * ) Notice: Under 35 U.S.C. 154(b), the term of this patent shall be extended for 0 days.

(21) Appl. No.: 09/178,165

(22) Filed: Oct. 23, 1998

(51) Int. Cl.[7] .................................................... G06F 17/50
(52) U.S. Cl. .............................................. 716/15; 438/26
(58) Field of Search ................................................ 716/15

(56) References Cited

PUBLICATIONS

R. Goering, PADS Purchase Brings in CAM Tools, Electronic Engineering Times, p. 18. Aug. 1998.*
Pads Software Increases Commitment to PCB Fabrication with CAM350 6.0, [online][Dialog file, World Reporter], Business Wire, Mar. 1999.*

* cited by examiner

Primary Examiner—Paul R. Lintz
Assistant Examiner—A. M. Thompson
(74) Attorney, Agent, or Firm—Columbia IP Law Group, LLC

(57) ABSTRACT

The present invention beneficially provides a method and apparatus for automatically removing acid traps from a hatched fill in a printed circuit board design. The printed circuit board design includes a cross-hatched fill area comprising boundary lines and cross-hatched lines within the boundary lines. Furthermore, the boundary lines and cross-hatched lines have a particular aperture. The printed circuit board design is automatically modified to fill partial hatch areas, if any, in the cross-hatched fill area. In one embodiment, the cross-hatched fill area is converted to a bit map of one dimensional edges representing the lines in the cross-hatched fill area. In this embodiment, partial hatch areas are identified based on the bit map, and edges are added in the identified partial hatch areas. Then, the embodiment converts the additional edges into corresponding lines in the printed circuit board design, wherein the lines have the particular aperture, to fill the partial hatch areas.

24 Claims, 15 Drawing Sheets

FIG. 3
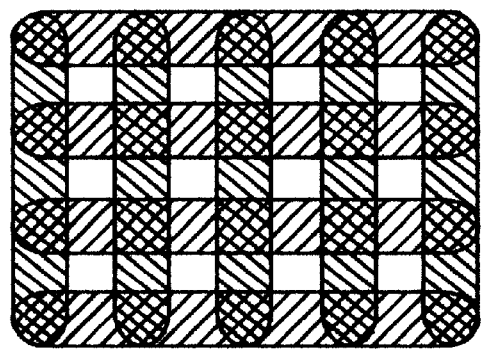
FIG. 4
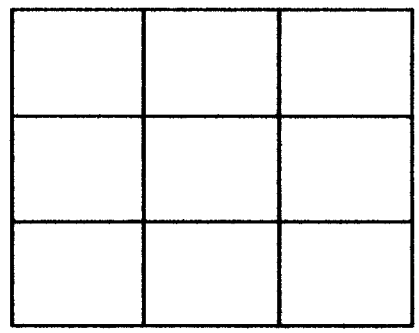
FIG. 5
    → 
APERTURE 510          LINE 520                    EDGE 530

METHOD AND APPARATUS FOR AUTOMATICALLY REMOVING ACID TRAPS FROM A HATCHED FILL IN A PRINTED CIRCUIT BOARD DESIGN

BACKGROUND OF THE INVENTION

1. Field of the Invention

The present invention pertains to the field of printed circuit board (PCB) design. More particularly, this invention relates to the art of removing acid traps from a hatched fill in a printed circuit board design.

2. Background

Printed circuit board (PCB) designers are under intense pressure to decrease design cycle times while simultaneously increasing the functionality and quality of design prototypes that are used to drive production. That is, a PCB prototype should not include features that are unusually difficult to mass produce and hence likely to decrease the yield rate, or percentage of usable PCBs. Time and money may be wasted if a prototype has to be altered to improve manufacturability. Predicting and correcting problems at the design stage is often much more efficient than correcting problems at a later stage.

One potential manufacturing problem comes from irregular circuit geometries that are often referred to as "acid traps" or "slivers." For instance, if the conductive material on a PCB includes sharp angles or small openings, mass producing the PCB may be unusually difficult, resulting in a low yield rate. For example, in a detractive manufacturing process, a PCB begins with a layer of conductive material, such as copper, covering a surface of the board. The board is dipped in an acid bath and rinsed to remove unwanted conductive material, leaving behind the circuit design. If the design includes sharp angles or small openings forming irregular pockets, the acid may not be rinsed entirely out of the irregular pockets on every board. In which case, the acid may continue to corrode the conductor, leaving behind open circuits and/or conductive residue which may deposit elsewhere on the board, potentially causing short circuits.

Sharp angles that form irregular pockets can also cause manufacturing problems, such as short circuits, in an additive manufacturing processes in which conductive material is added rather than removed. For instance, conductive traces may run together at sharp angles or small openings. Furthermore, where traces run together, a drop of liquefied conductive material may flow into surrounding areas or traces.

Acid traps and slivers, generically referred to herein as acid traps, are particularly troublesome in hatched fill areas of printed circuit boards. A hatched fill is an area of a printed circuit board that is filled with a cross-hatched pattern of conductive material for any of a variety of reasons, such as to provide shielding, a ground plan, etc. If the boundaries of a hatched fill area are irregular with respect to the fill pattern within the boundary, acid traps are almost certain to occur. For this reason, many designers may be reluctant to use hatched fills, even though hatched fills can be very useful, because hatched fills often have to be altered at the prototype stage to improve manufacturability. Alterations may involve manually identifying and filling in potential problem areas on a design; a process that can be tedious and error ridden.

Thus, a need exists for a method and apparatus for automatically removing acid traps from a hatched fill in a printed circuit board design.

SUMMARY OF THE INVENTION

The present invention beneficially provides a method and apparatus for automatically removing acid traps from a hatched fill in a printed circuit board design. The printed circuit board design includes a cross-hatched fill area comprising boundary lines and cross-hatched lines within the boundary lines. Furthermore, the boundary lines and cross-hatched lines have a particular aperture. The printed circuit board design is automatically modified to fill partial hatch areas, if any, in the cross-hatched fill area. In one embodiment, the cross-hatched fill area is converted to a bit map of one dimensional edges representing the lines in the cross-hatched fill area. In this embodiment, partial hatch areas are identified based on the bit map, and edges are added in the identified partial hatch areas. Then, the embodiment converts the additional edges into corresponding lines in the printed circuit board design, wherein the lines have the particular aperture, to fill the partial hatch areas.

BRIEF DESCRIPTION OF THE DRAWINGS

Examples of the present invention are illustrated in the accompanying drawings. The accompanying drawings, however, do not limit the scope of the present invention. Like references in the drawings indicate similar elements.

FIGS. 3–5 illustrate the relationship between a cross-hatched fill area and a bit map.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Figure 1:
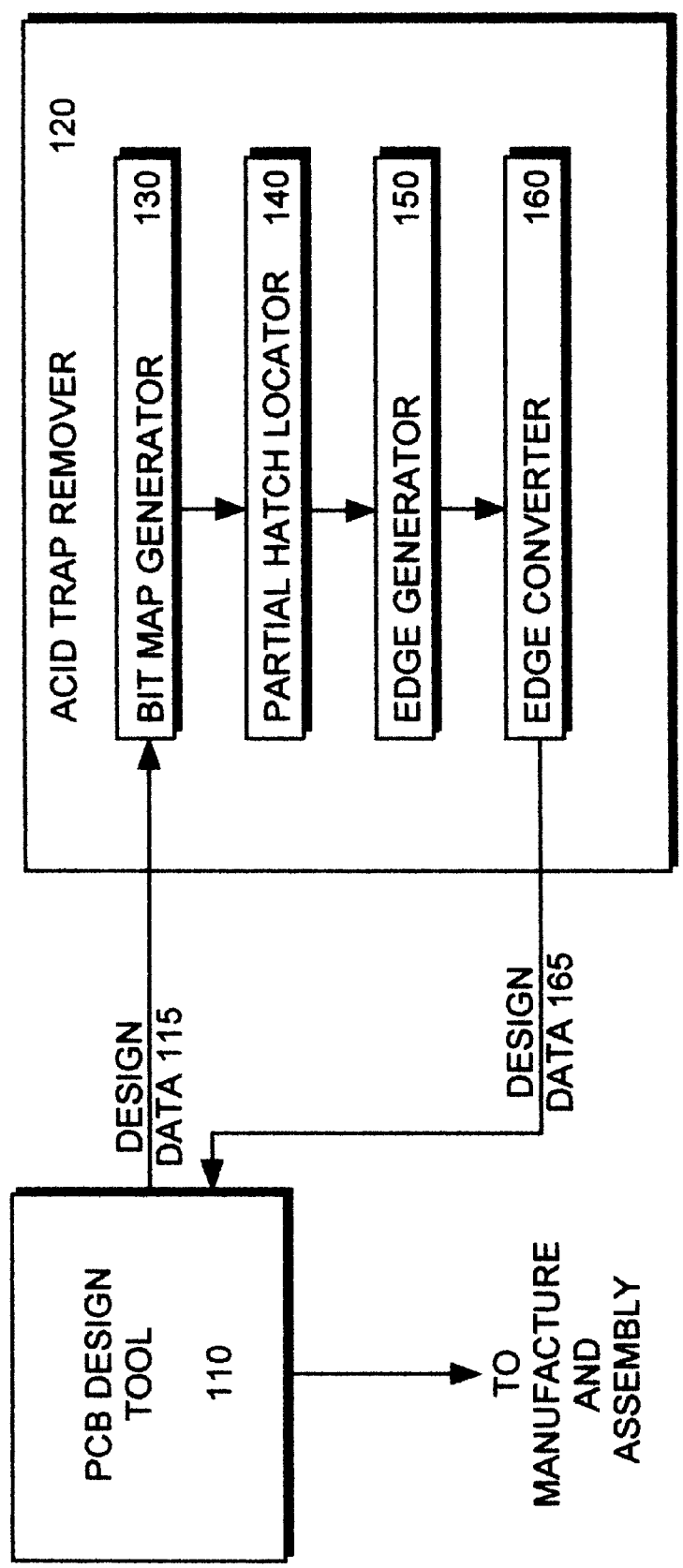
FIG. 1 illustrates one embodiment of the present invention.

FIG. 1 illustrates one embodiment of the present invention used in conjunction with a printed circuit board (PCB) design tool. The present invention automatically modifies a PCB design to beneficially remove acid traps in cross-hatched fill areas of the design. The present invention removes the acid traps by filling in irregular openings in the cross-hatched pattern.

Irregular openings can occur along the boundaries of a cross-hatched area. For instance, if a boundary is not aligned with a cross-hatched pattern, openings along the boundary are necessarily smaller and shaped differently than regular openings in the cross-hatched pattern. If the irregular openings are too small or include sharp angles, the openings may trap acid.

In many circumstances, removing acid traps at the design phase is more efficient than removing acid traps from a physical prototype or mask. Thus, the present invention automatically removes acid traps from cross-hatched fill areas at the design phase itself. As long as appropriate design data is available, however, the present invention can remove acid traps from cross-hatched fill areas in a design at any stage in the design or manufacturing process.

In the illustrated embodiment, PCB design tool 110 provides acid trap remover 120 with design data 115. Acid trap remover 120 fills irregular openings, if any, in cross-hatched areas in design data 115 and returns modified design data 165 to PCB design tool 110. Other approaches may eliminate irregular openings by readjusting boundaries of cross-hatched areas to align the boundaries with the cross-hatched pattern. These approaches have certain drawbacks such as potential breaks in connectivity. The present invention, however, removes acid traps while beneficially preserving the boundary geometry of cross-hatched areas by filling irregular openings rather than readjusting boundaries.

Figure 2:
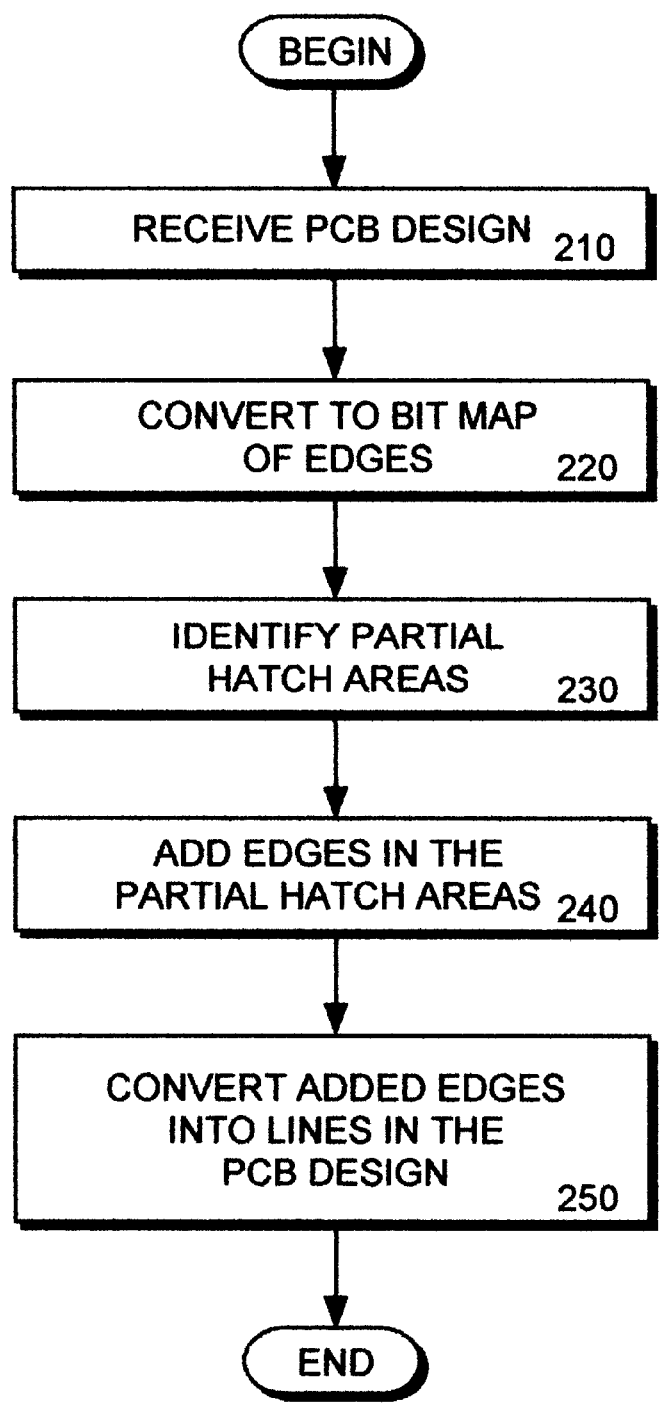
FIG. 2 demonstrates one embodiment of the present invention.

FIG. 2 provides an overview of one embodiment of acid trap remover 120. First in step 210, acid trap remover 120 receives PCB design data 115 which may include one or more cross-hatched fill areas. Design data 115 is provided to bit map generator 130. In step 220, bit map generator 130 generates a bit map of the cross-hatched fill areas in the PCB design. As explained below, each line in the cross-hatched fill areas in the PCB design is represented in the bit map by what is referred to herein as an edge. In step 230, partial hatch locator 140 uses the bit map to identify partial hatch areas, or areas of irregular cross-hatch openings. Next, in step 240, edge generator 150 adds edges in the partial hatch areas using the bit map. Then, edge converter 160 modifies design data 115 by converting the edges added to the bit map into lines which fill the partial hatch areas in the PCB design, in step 250. The modified design data 165 is returned from acid trap remover 120 to PCB design tool 110.

PCB design tool 110 represents any one of a number of design tools, and includes various stages of layout, simulation, verification, etc. Design data 115 represents a PCB design in any of a number of formats. One such format is discussed below with reference to FIGS. 3–5.

FIGS. 3–5 illustrate the relationship between a cross-hatched fill area and a bit map. In FIG. 3, a cross-hatched fill area comprises orthogonal lines in a bounded area. In alternate embodiments, boundary lines can form a wide range of one or more polygons. FIG. 4 illustrates a bit map corresponding to the fill area of FIG. 3. FIG. 5 illustrates an aperture 510 for a line 520. Aperture 510 represents the radial distance that line 520 extends out from any point along the center of line 520. Each line in FIG. 3 has an aperture such as aperture 510. Edge 530 corresponds to the center line of line 520. In other words, edge 530 corresponds to a center point of aperture 510 as aperture 510 is moved over the length of line 520 so that edge 530 represents the length and direction of line 520, but not the aperture of line 520.

The bit map of FIG. 4 comprises edges corresponding to center points of the apertures for the lines of FIG. 3. In alternate embodiments, an edge may correspond to different points on an aperture, such as a point on the circumference of an aperture.

For the purposes of this patent, a line refers to one of the components comprising a cross-hatched fill area in a PCB design, such as the fill area illustrated in FIG. 3. Each line has a length, direction, and aperture. An edge refers to one of the components comprising a bit map representation of a cross-hatched fill area, such as the bit map illustrated in FIG. 4. Edges correspond to the length and direction of lines, but without the aperture.

One embodiment of design data 155 stores the length and direction of lines with respect to a coordinate system, and stores the aperture of the lines separately. In which case, a bit map of edges may be equivalent to the part of the design data which stores the length and direction of the lines. If a design is displayed or manufactured, each line in the design data is drawn with the appropriate aperture, resulting in a cross-hatched pattern such as the one shown in FIG. 3. If the design data is stored in some other format, any one of a number of approaches can be used to generate a corresponding bit map of edges.

Figure 6:
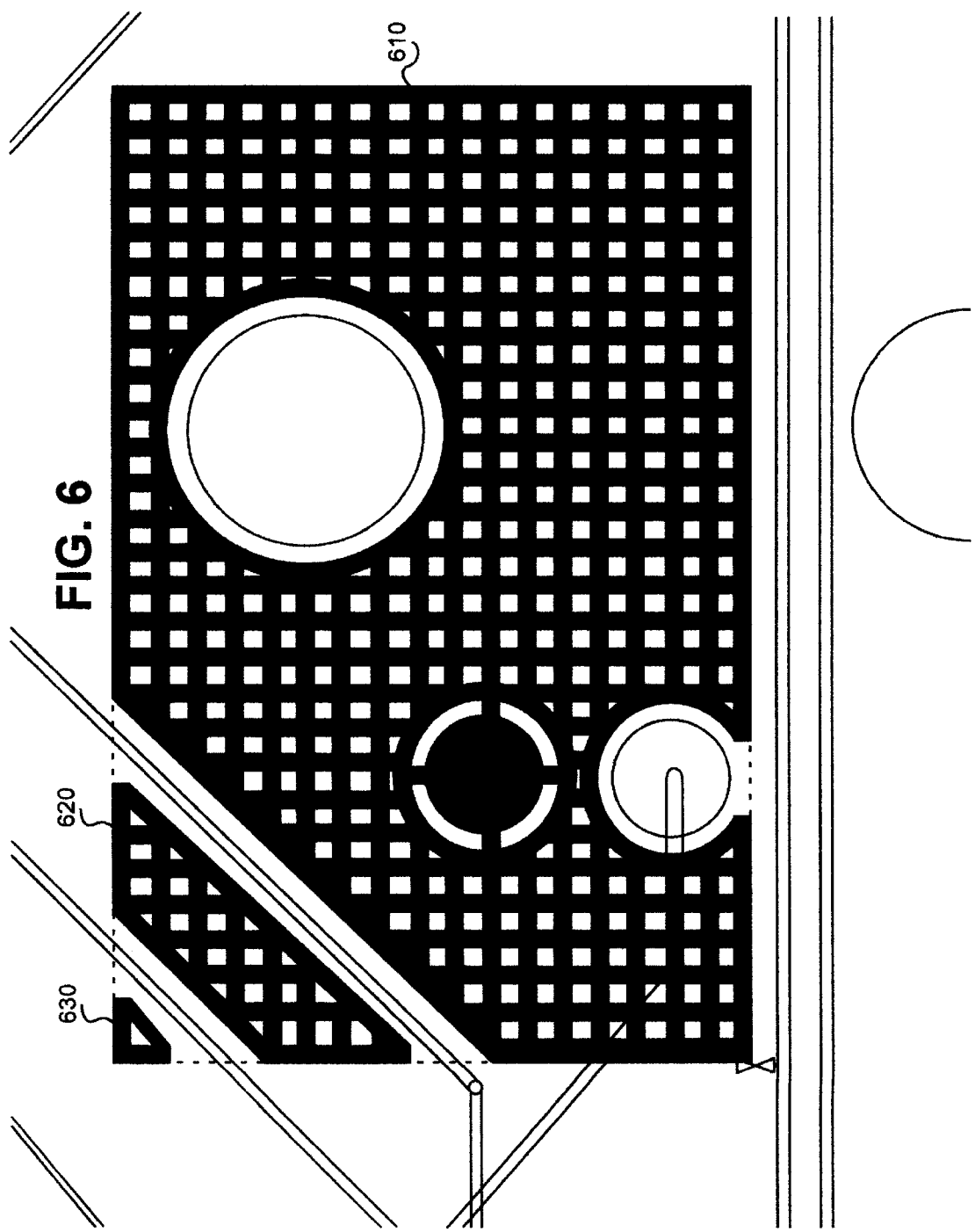
FIGS. 6–15 illustrate an example of removing acid traps from a cross-hatched fill area using certain embodiments of the present invention.

FIGS. 6–15 demonstrate an example of a modification of a PCB design performed by one embodiment of the present invention. As shown in FIG. 6, design data 115 represents a PCB design including cross-hatched fill areas 610, 620, and 630. Boundary lines for area 610 form several polygons, including an outer boundary, that is roughly rectangular with a corner cut off, and three circular inner boundaries. Within the boundary lines, area 610 is filled with a cross-hatch pattern of lines. The boundary lines and hatch lines all have the same aperture. The hatch lines are all orthogonal and uniformly spaced. Alternate embodiments may include hatch lines that are not uniformly spaced and not orthogonally oriented.

Bit map generator 130 receives design data 115 and generates bit maps corresponding to the fill areas. Fill areas can be identified in any number of ways. For instance, bit map generator 130 can scan design data 115 for sets of lines meeting a certain design criteria for cross-hatched fill areas. In one example, a particular number of repeating orthogonal lines, or lines having a particular aperture, define cross-hatched fill areas. In another example, cross-hatched fill areas are defined by special flags in design data 115.

Once area 610 is recognized as a fill area, a bit map can be generated from it. In one embodiment, bit map generator 130 uses a boundary generator to trace a particular aperture point over each boundary line, creating a one dimensional edge representing each of the boundaries. Then, bit map generator uses a contour generator to fill the inside of the boundary with a contour of edges. For instance, hatch lines may be uniformly spaced, so based on a reference point, the uniform spacing, and the relative position of the boundaries, edges can be created that correspond to a particular aperture point for each hatch line. The edges comprising only the cross-hatched pattern within the boundaries of a bit map is referred to herein as a contour of edges.

Figure 7:
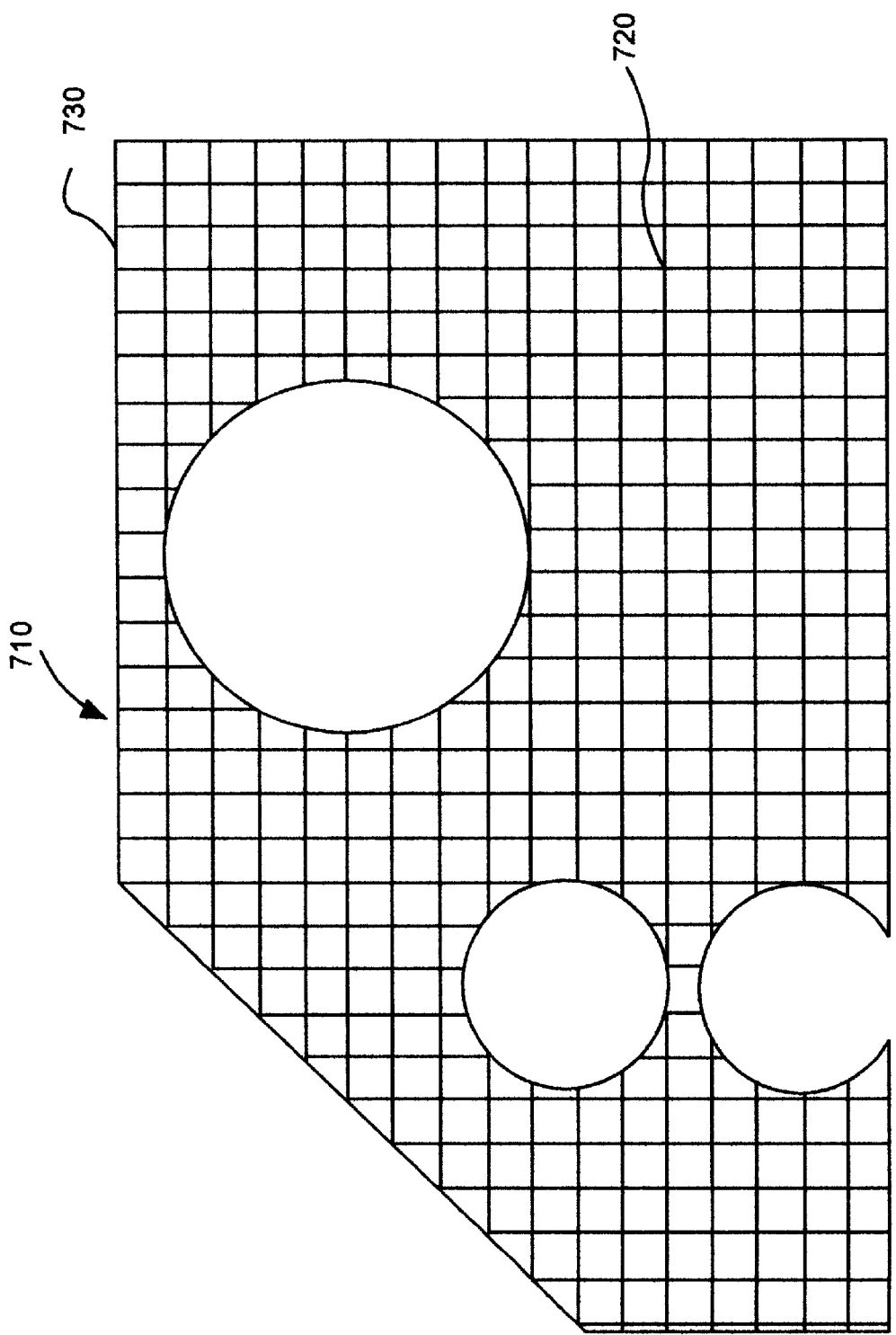

In one embodiment, the bit map is a mathematical representation of area 610 in a two-dimensional coordinate plane. FIG. 7 illustrates one embodiment of a bit map 710 representing cross-hatched fill area 610. Bit map 710 is comprised of one dimensional edges representing the individual lines in area 610.

In an alternate embodiment, as discussed above, design data 115 stores a cross-hatched fill area as a series of lines. For each line, the length and direction are stored separately from the aperture. In which case, generating the bit map of edges merely involves identifying the length and direction of each line in a cross-hatched fill area, including the boundary lines.

Next, partial hatch locator 140 uses the bit map 710 to locate partial hatch areas, or areas of irregular hatch openings. Each edge in the bit map can be thought of as a collection of segments, wherein segments are separated by intersections with other edges. At every intersection surrounded by regular openings, four orthogonal edge segments intersect. For instance, at intersection 720, the surrounding openings in the hatch pattern are all regular and the number of intersecting orthogonal segments is four. Along the boundary edges, however, four orthogonal segments do not intersect at each intersection. Therefore, areas of irregular openings can be located by locating intersections where fewer than four orthogonal segments meet.

Figure 8:
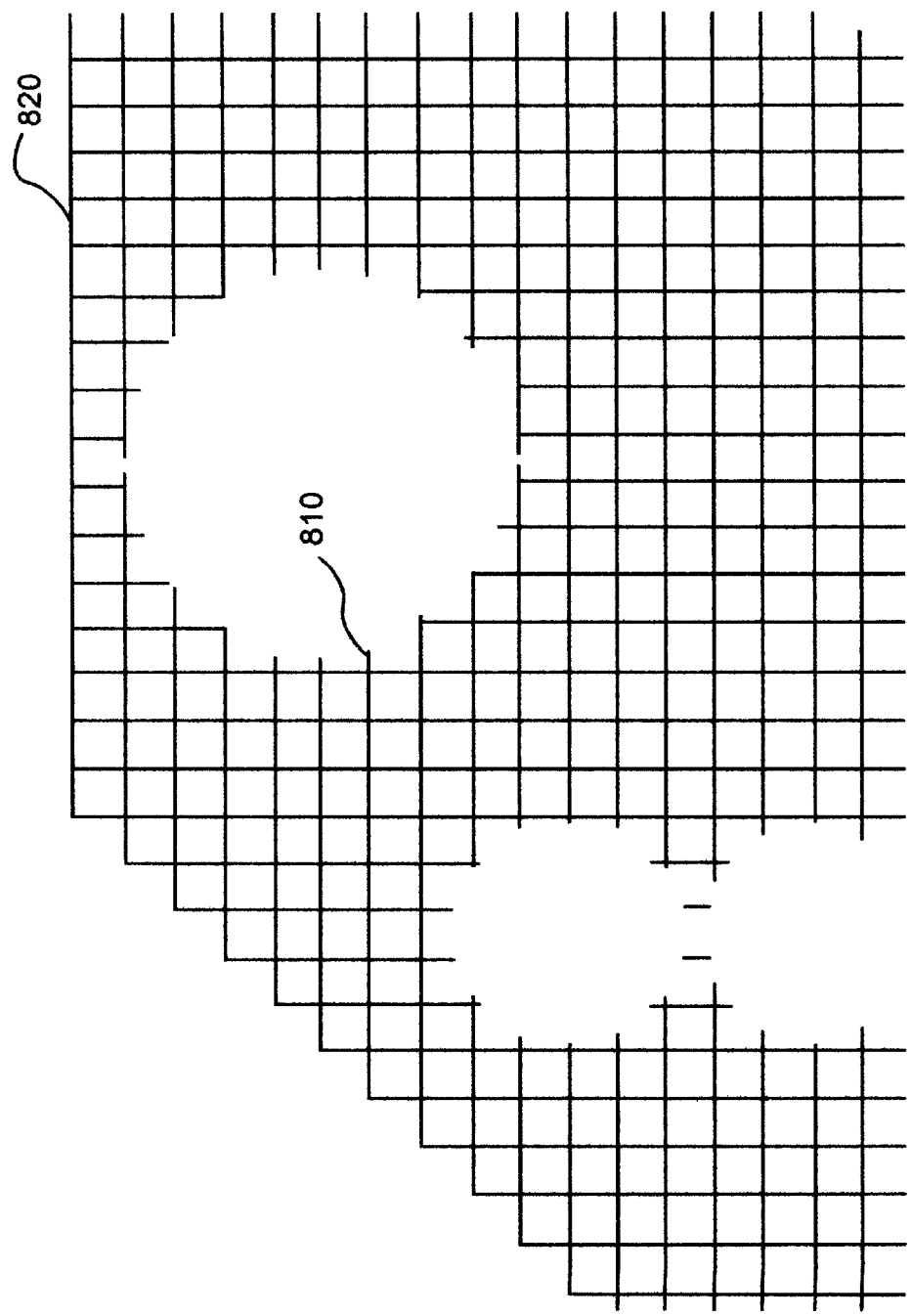

The irregular openings may be easier to see in FIG. 8. In FIG. 8, only the contour of edges is shown and the boundary edges have been removed. Every cell in the contour that is completely enclosed is a regular opening. Every cell in the contour that is not enclosed is an irregular opening. That is, if a partial segment is extending away from the rest of the contour in FIG. 8, then the area around the partial segment that would be inside the boundary shown in FIG. 7 comprises a partial hatch area. For instance, edge segment 810 extends away from the contour, and the areas above and below segment 810 that would be inside the boundary edges are part of a partial hatch area.

In one embodiment, partial hatch locator 140 includes circuitry to determine how many orthogonal edge segments intersect at each intersection within bit map 710. Where less than four segments are counted, irregular openings are located. In an alternate embodiment, since irregular openings only occur along boundary edges, the circuitry only considers intersections with boundary edges.

Boundary edge 730 and contour edge 820 may be very close or even overlap. In fact, in FIG. 7 the two edges are impossible to discern. Nevertheless, as discussed below, the edges may be treated as separated edges having a infinitely small partial hatch area separating them. In other embodiments, the edges may be treated as separate edges, although this may introduce more complications for edge generator 150, as discussed below.

Figure 9:
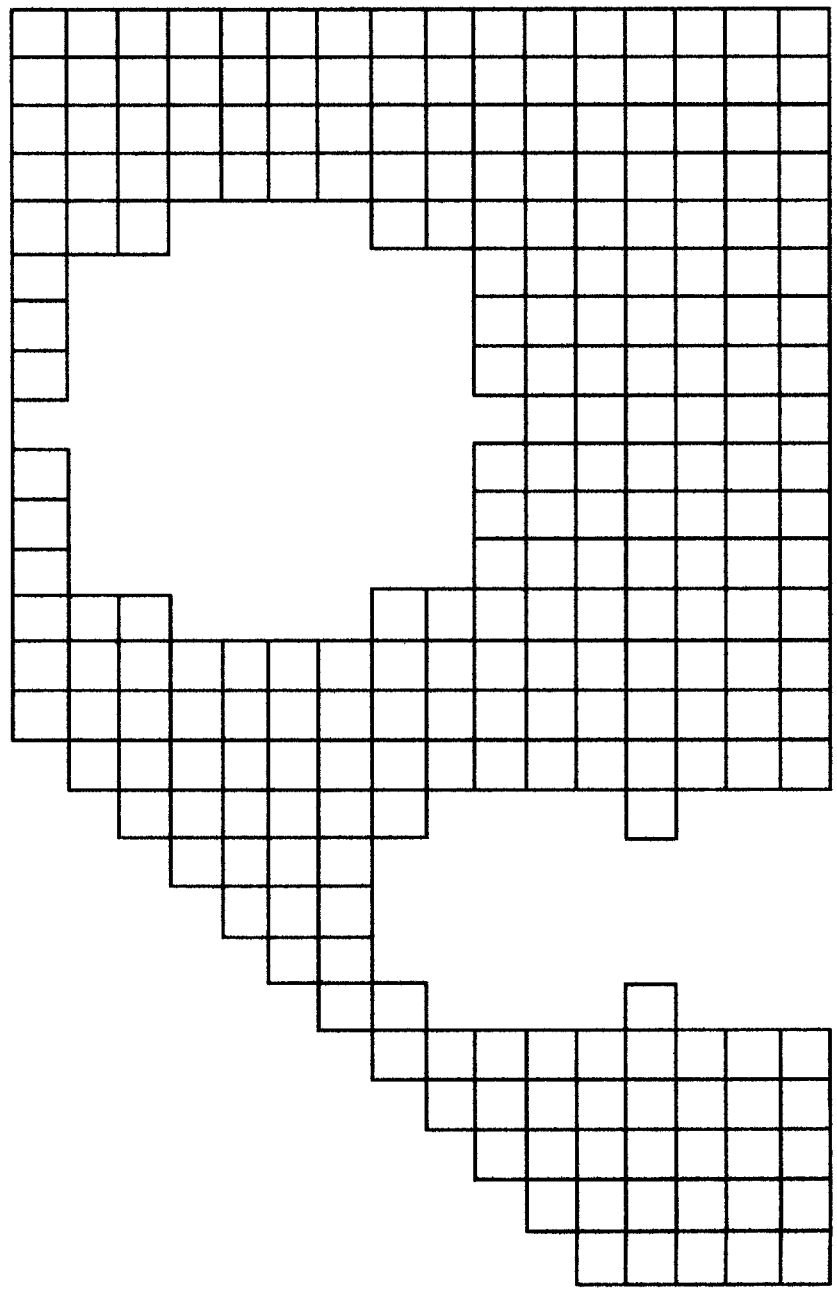
Figure 10:
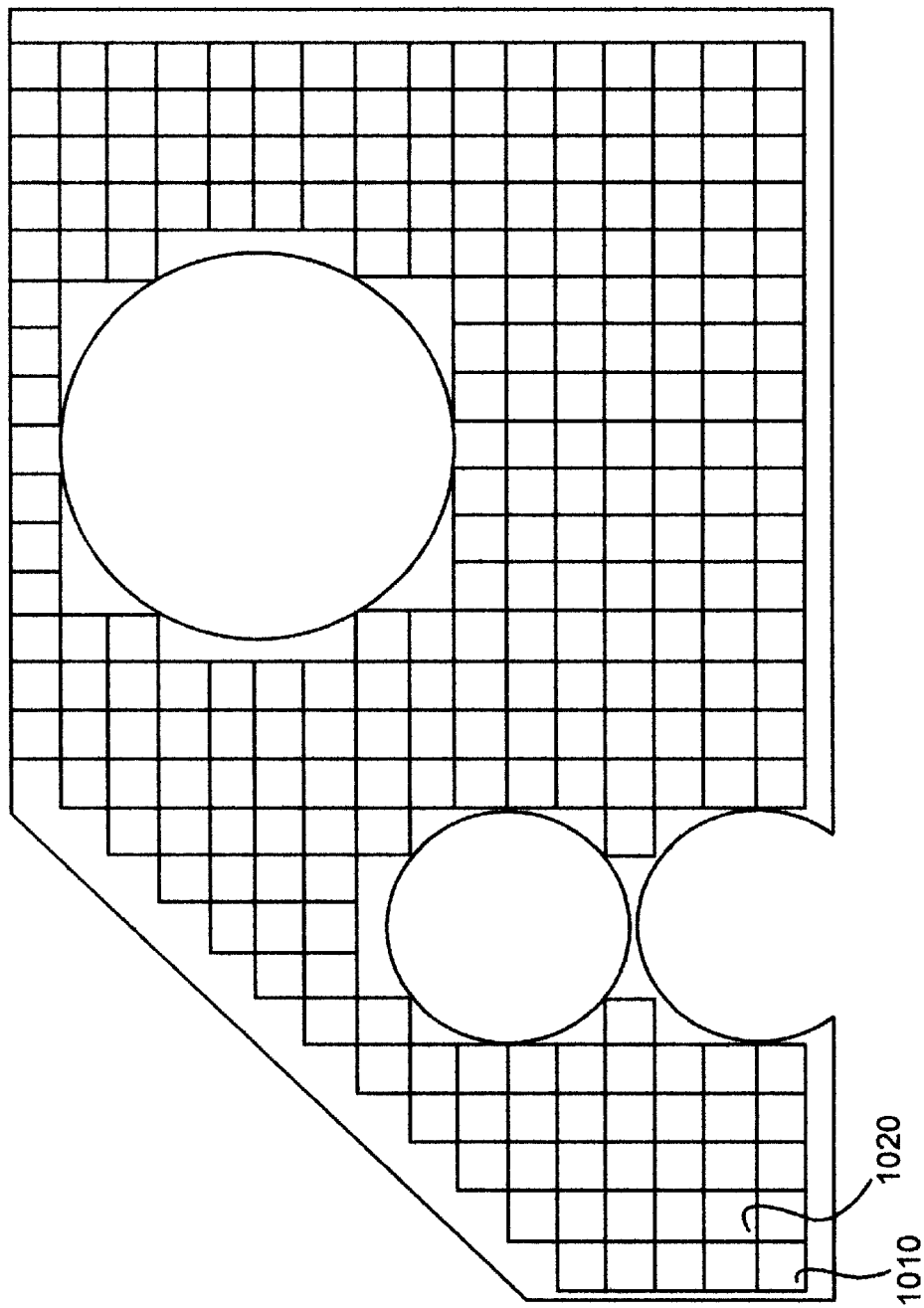

Once the partial hatch areas have been identified, edge generator 150 adds edges in the partial hatch areas. In one embodiment, edge generator 150 includes circuitry to perform four steps in the process of adding edges. First, edge generator 150 shortens the partial segments that extend into the partial hatch areas. In other words, the partial segments are removed. FIG. 9 illustrates the contour with the partial segments removed. In FIG. 9, only regular openings remain in the contour of edges. FIG. 10 illustrates the contour inside the boundary edges after removing the partial segments. In FIG. 10, the partial hatch areas extend along the boundary edges. If the bit map of FIG. 10 were drawn with lines having an aperture, the design would not have any irregular hatch openings, but gaps would exist in the partial hatch areas between the boundary lines and the cross-hatch lines. The gaps may also form acid traps or lead to breaks in connectivity, so the goal is to fill in the gaps.

Figure 11:
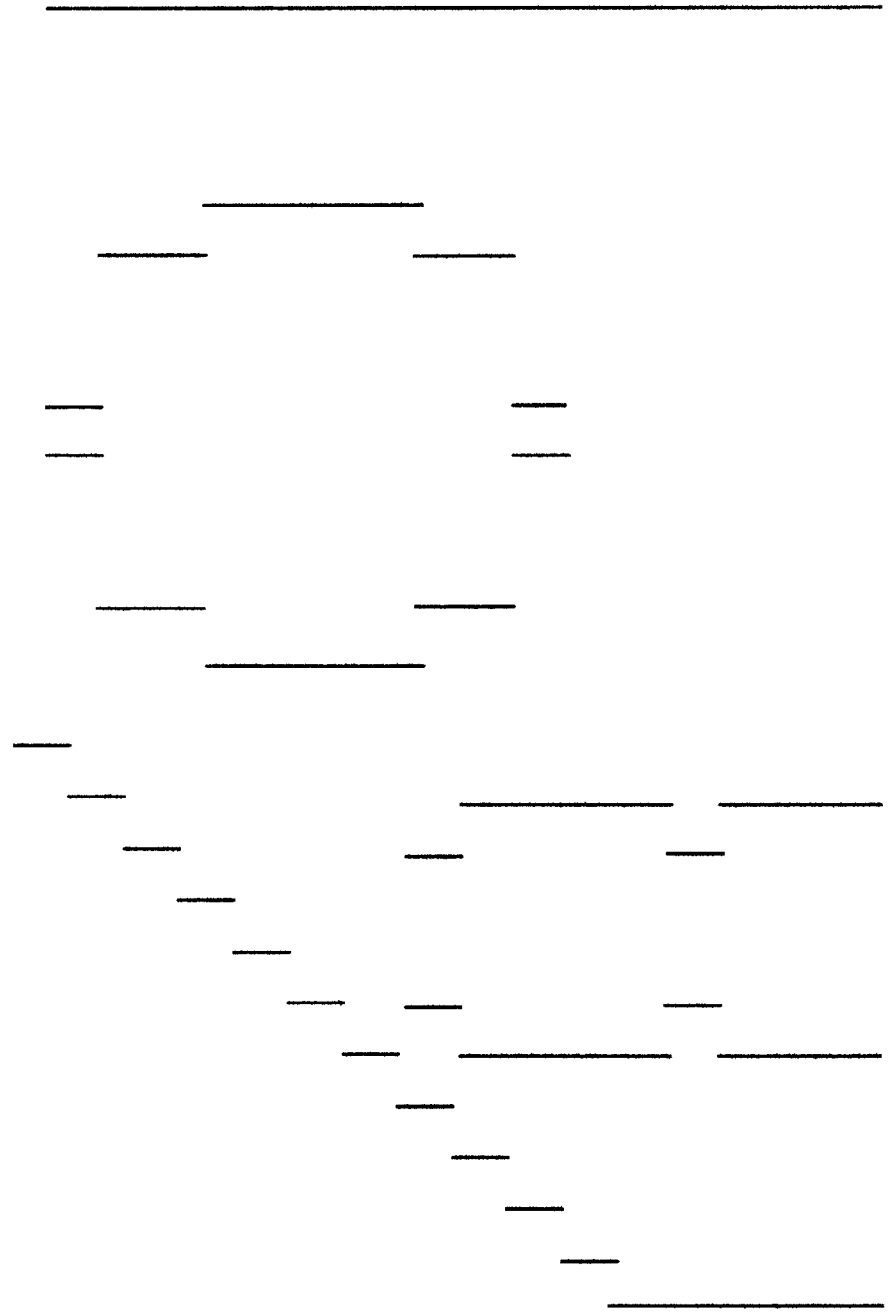

Second, edge generator 150 isolates a set of edges in a first coordinate direction of the contour of edges, wherein the set of edges border the partial hatch areas. For instance, edge generator 150 can isolate vertical edges of the contour that border the partial hatch areas. In one embodiment, edge generator 150 identifies the set of vertical edges as the vertical edges of the contour immediately adjacent to the partial segments that were previously removed. FIG. 11 illustrates the set of isolated vertical edges.

Figure 12:
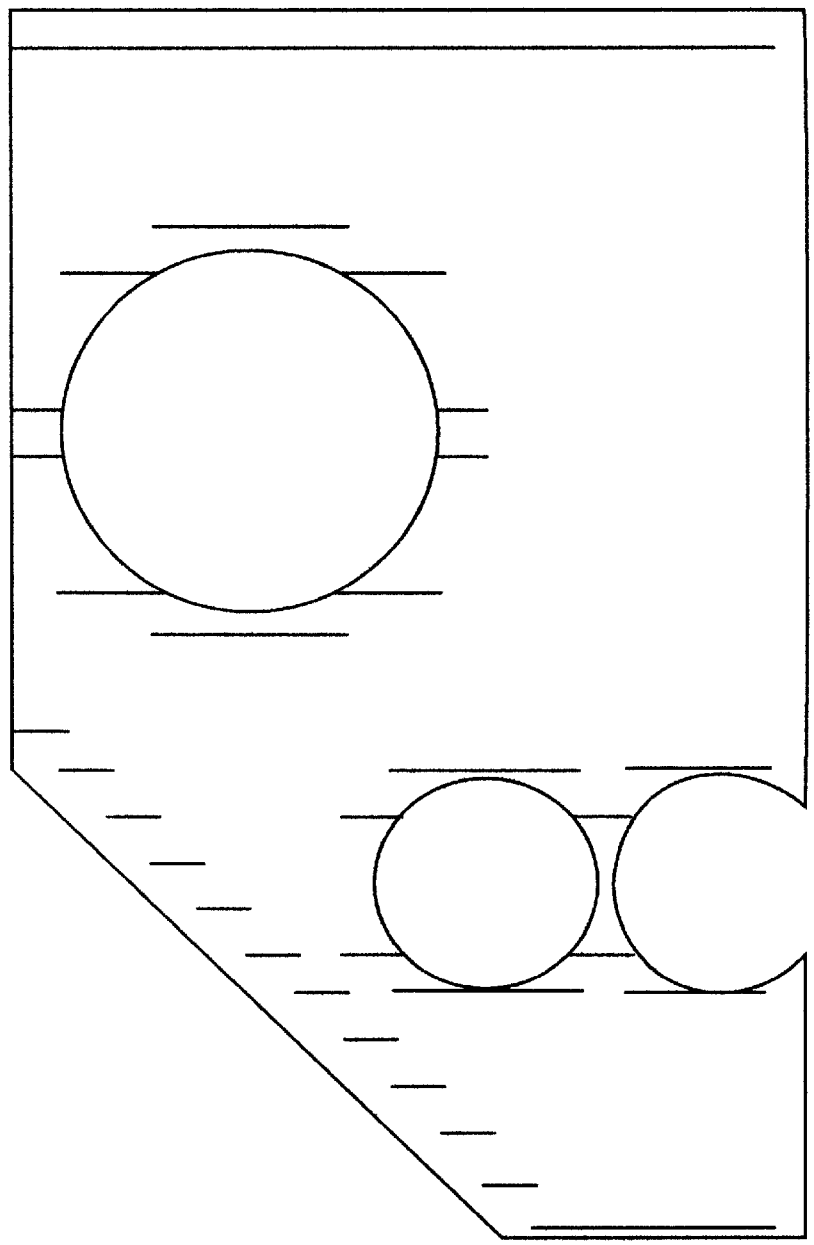

Third, edge generator 150 uses a plane sweep technique to determine where to add edges. FIG. 12 illustrates the isolated vertical edges and the boundary edges which are swept with a series of parallel sweeps. The parallel sweeps are made in the second coordinate direction of the contour of edges. The sweeps are spaced at regular intervals in the first coordinate direction. In the illustrated embodiment, the first coordinate direction is vertical, so the parallel sweeps are horizontal across FIG. 12 at regular vertical intervals.

Figure 13:
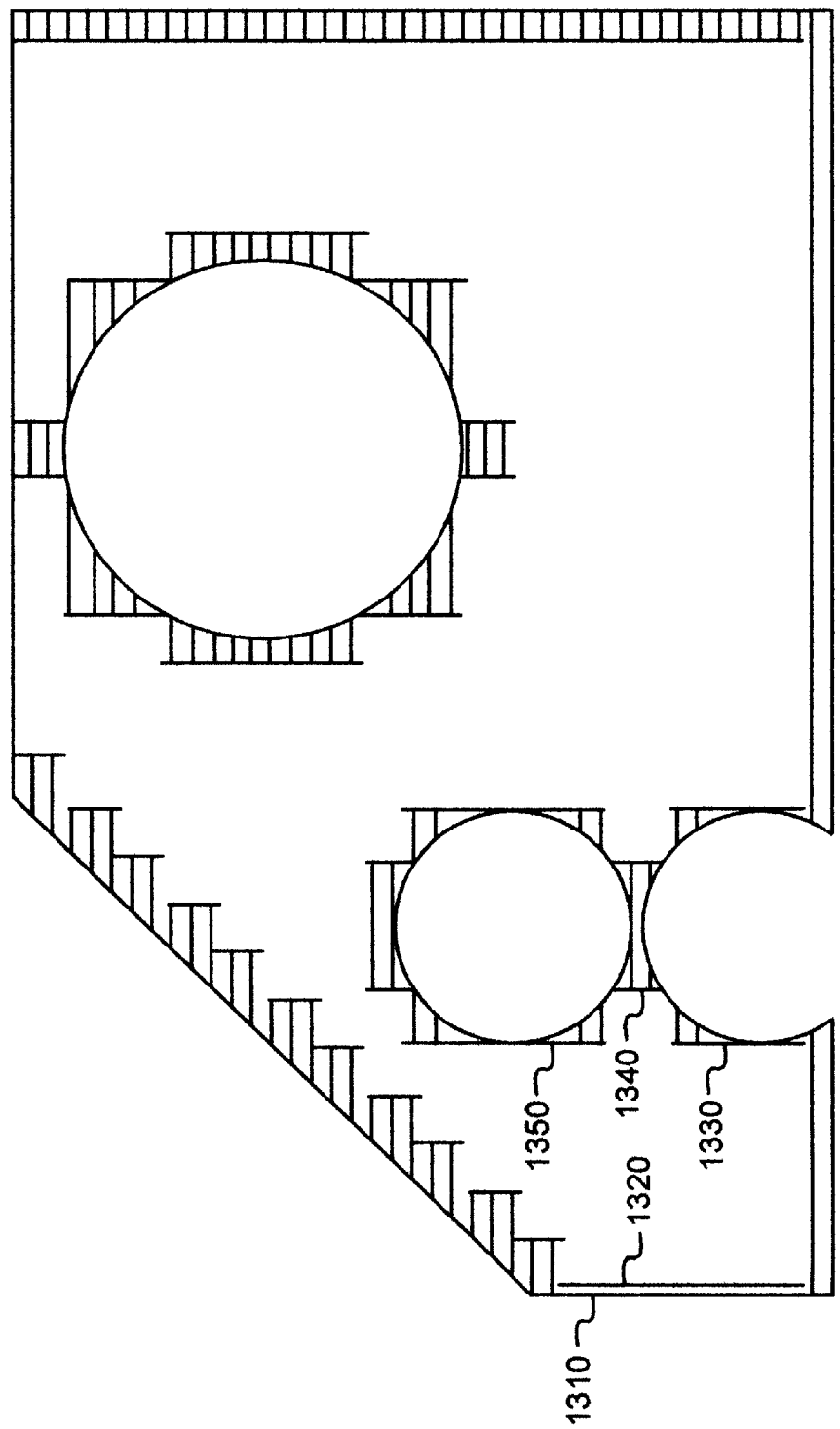

Fourth, horizontal edges are added along the horizontal sweeps according to a set of employment rules so that edges are added in the partial hatch areas along the horizontal sweeps. FIG. 13 illustrates the added edges. In one embodiment, the employment rules require that coordinates are obtained for every intersection along a given sweep. A sweep may intersect a number of boundary edges and isolated vertical edges. Pairs of intersections define fill segments between exclusive pairs of intersections, starting from a first intersection with a first boundary edge along a given parallel sweep. Then, the length of each fill segment is determined based on the coordinates, and an edge is generated along the fill segments that are longer than the aperture of a line. An example is discussed below.

As illustrated in FIG. 10, every partial hatch area is completely bounded. The vertical bounds of each partial hatch area is shown in FIG. 12. So, if a horizontal sweep is taken across any point in FIG. 12, each partial hatch area that is intersected by the horizontal sweep will have a beginning point and an ending point, and the space in between the points defines a fill segment where an edge should be added. In other words, if any intersections are encountered, there will always be an even number of intersections. Sets of intersections are mutually exclusive so that if a fill segment begins at a first intersection, then the fill segment ends at a second intersection. If a third intersection is encountered, the distance between the second and third intersections is skipped and the fill segment begins at the third intersection. If there is a beginning, there necessarily is an ending, so the fill segment will end at the fourth intersection. The pattern of filling a segment between intersections and skipping a next segment continues over the length of a given sweep.

An edge is not added for every fill segment, however. Lines in the PCB design have an aperture. If intersections are closer together than the aperture of a line, no edge needs to be added because the aperture of the lines will fill in the area. For instance, the horizontal distance between boundary edge 1310, in FIG. 13, and isolated contour edge 1320 is less than the aperture of a line in the PCB design, so no horizontal edges were needed.

Those skilled in the art will recognize that any one of a number of techniques can be used to identify where edges should be added.

As mentioned above, if the boundary edge aligns with the contour, the boundary edge may still be considered two separate edges that are separated by an infinitely small distance. For instance, if edge 1310 and edge 1320 overlapped, the distance between them would be zero and no edges would be added. Since intersections are mutually exclusive and only come in pairs, the distance along the horizontal sweeps after edges 1310 and 1320 would be skipped until beginning the next edge at one of edges 1330, 1340, or 1350, depending on where the sweep is made.

If edges 1310 and 1320 are treated like a single edge, though, an odd number of intersections may be encountered. Additional calculations need to be made to determine were to start the first fill segment along a given horizontal sweep. For instance, in one embodiment, a boundary edge will not be mapped to the sweep plane if it does not border a partial fill area. In which case, fill segments begin at the first encountered edge along a sweep, but the first edge may not be a boundary edge.

The intervals between parallel sweeps are less than or equal to the aperture of a line so that the lines will fill in the partial hatch areas in the printed circuit board (PCB) design. Edge converter 160 modifies the PCB design data by adding edges based on the bit map and the plane sweep technique. Edge converter 160 provides modified design data 165 back to PCB design tool 110.

Figure 14:
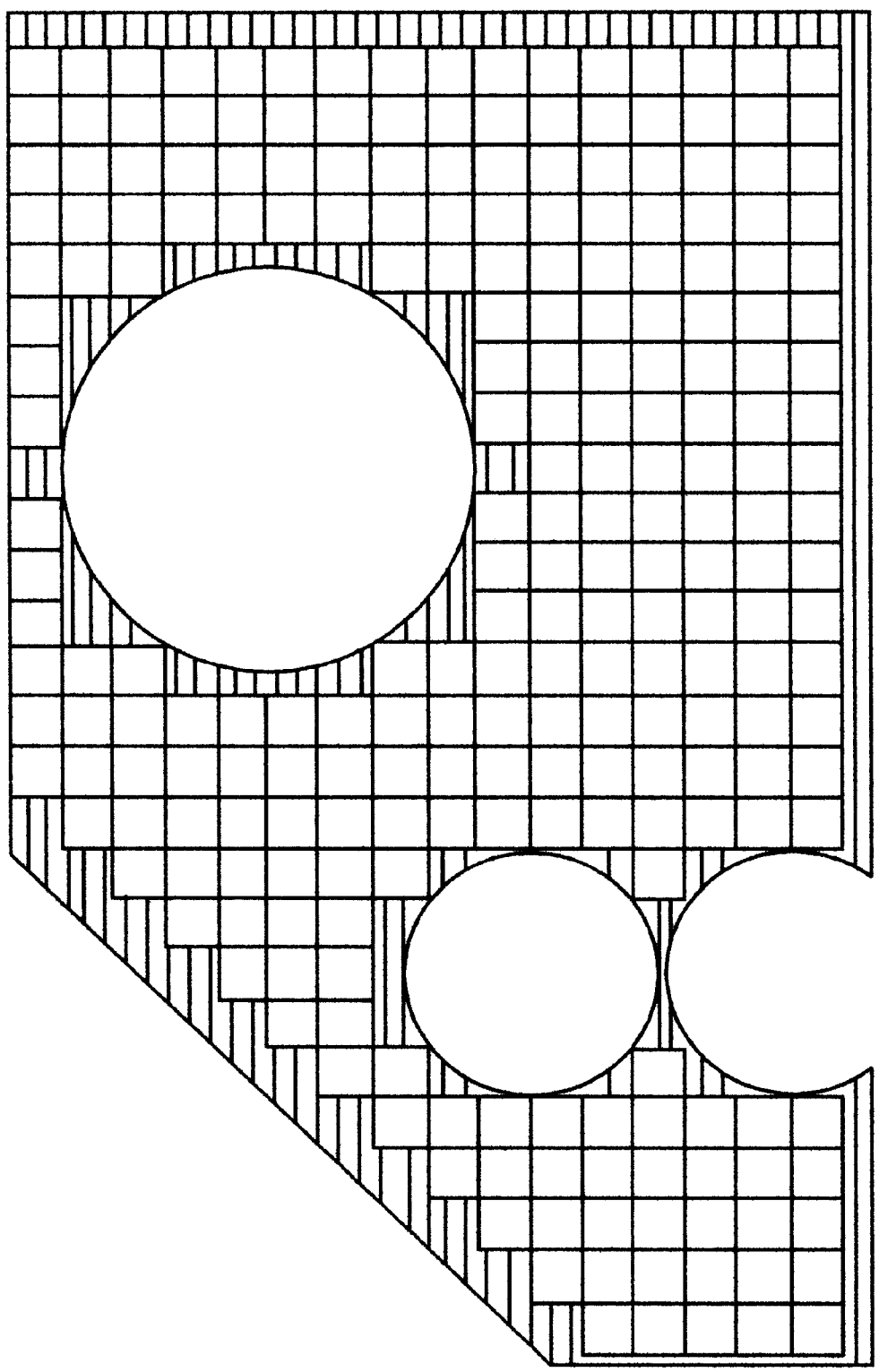
Figure 15:
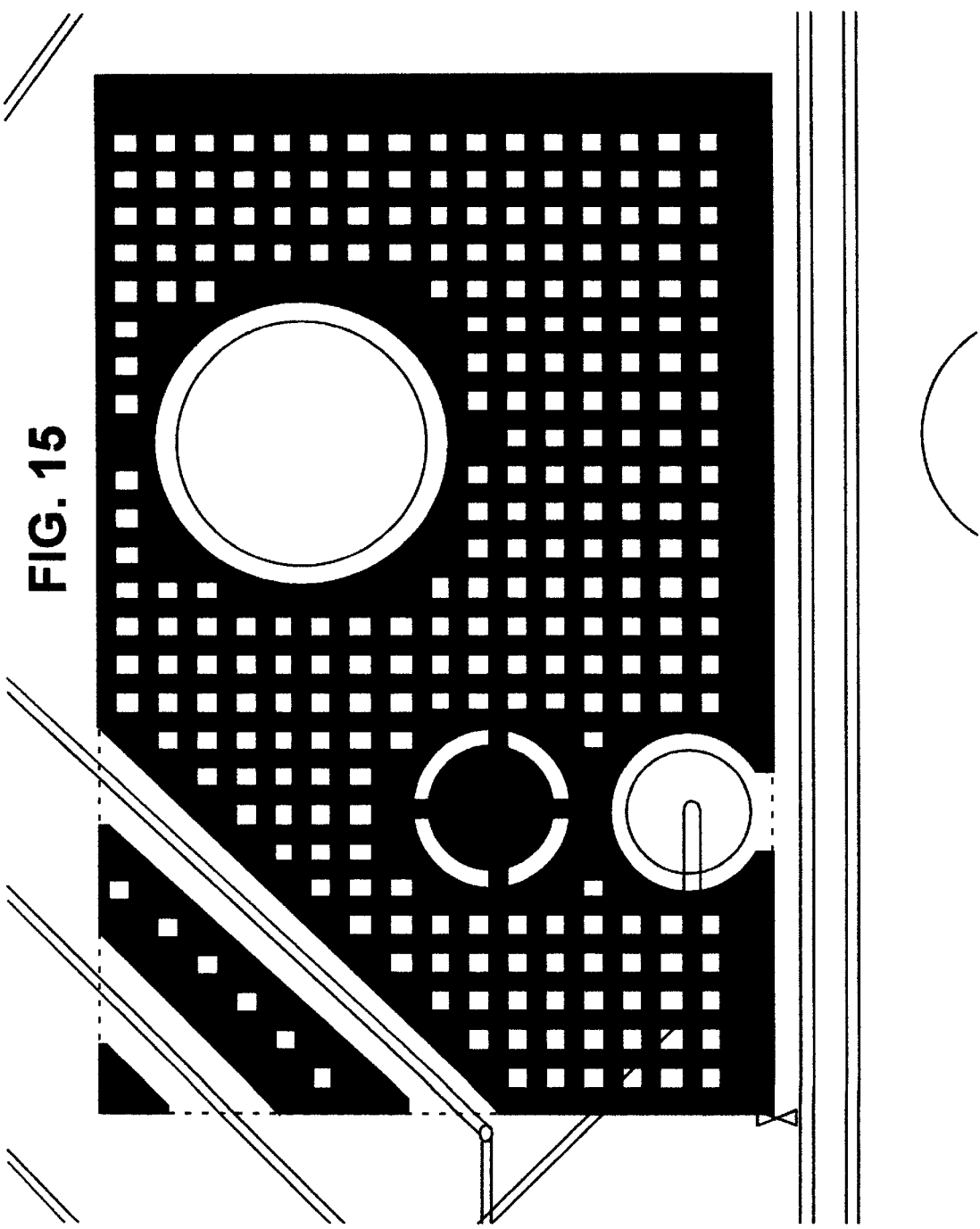

FIG. 14 illustrates the bit map with the added edges. FIG. 15 illustrates the PCB design after acid trap remover 120 has filled in the partial hatch areas. The remaining hatch openings are uniform in size and shape to improve manufacturability while maintaining the geometry of the cross-hatched fill areas.

After having read the foregoing, those skilled in the art will recognize that numerous alternate embodiments are possible. For instance, in one alternate embodiment, partial hatch areas are located in the bit map by counting the number of unit length segments at each intersection of the contour of edges in the bit map. If at any intersection less than four unit length segments meet, then a partial fill area is identified. That is, if any one or more segments at an intersection are shorter than the predefined unit length for a segment, then the area surrounding the shorter segment or segments is within a partial fill area. In which case, the shorter segments can be pulled back, or removed, from the partial fill area, creating the gaps as discussed above with respect to FIG. 10.

Another alternate embodiment may isolate the vertical edges of the contour in a different way. For instance, in FIG. 10, each cell of the contour of edges can be visited and labeled either an interior cell or a cell adjacent to a partial fill area. For instance, cell 1020 is an interior cell and cell 1010 is a cell adjacent to a partial fill area. Cell 1010 can be identified because segments where removed from at least one of its intersections. Then, the isolated vertical edges can be generated by stringing together vertical segments of the cells wherein the segments border the partial fill areas.

Figure 16:
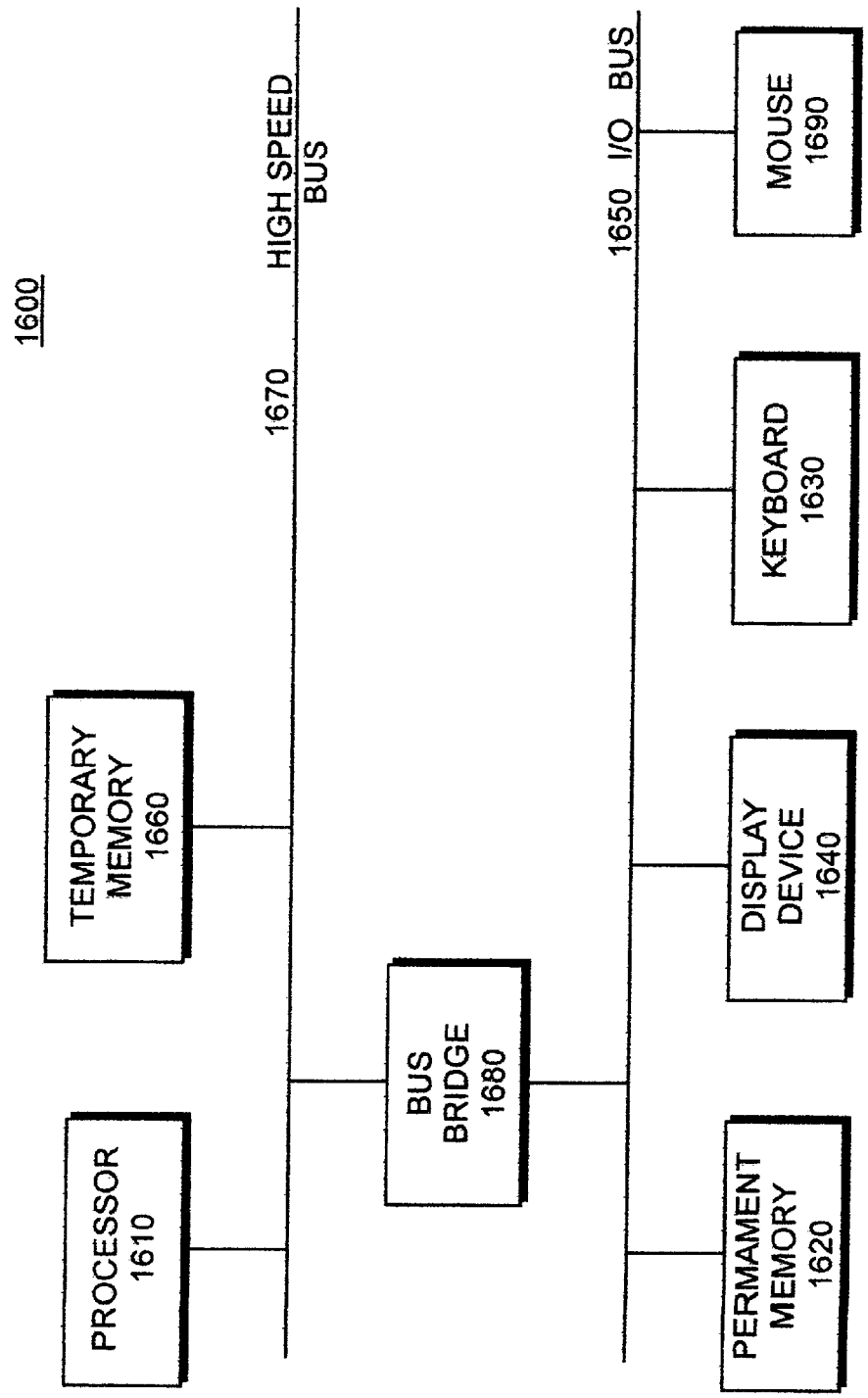
FIG. 16 illustrates an example hardware system to implement certain embodiments of the present invention.

FIG. 16 is intended to represent a broad category of computer systems including, but not limited to, those based on the Pentium® processor, Pentium® Pro processor, and Pentium® II processor manufactured by and commonly available from Intel Corporation of Santa Clara, Calif., or the Alpha® processor manufactured by Digital Equipment Corporation of Maynard, Mass. In FIG. 16, processor 1610 includes one or more microprocessors. Processor 1610 is coupled to temporary memory 1660 by high speed bus 1670. High speed bus 1670 is coupled to Input/Output bus 1650 by bus bridge 1680. Permanent memory 1620 and Input/Output devices, including display device 1640, keyboard 1630, and mouse 1690, are also coupled to Input/Output bus 1650. In certain embodiments, one or more components may be eliminated, combined, and/or rearranged. A number of additional components may also be coupled to either bus 1650 and/or 1670 including, but not limited to, another bus bridge to another bus, one or more disk drives, a network interface, additional audio/video interfaces, additional memory units, additional processor units, etc.

Figure 17:
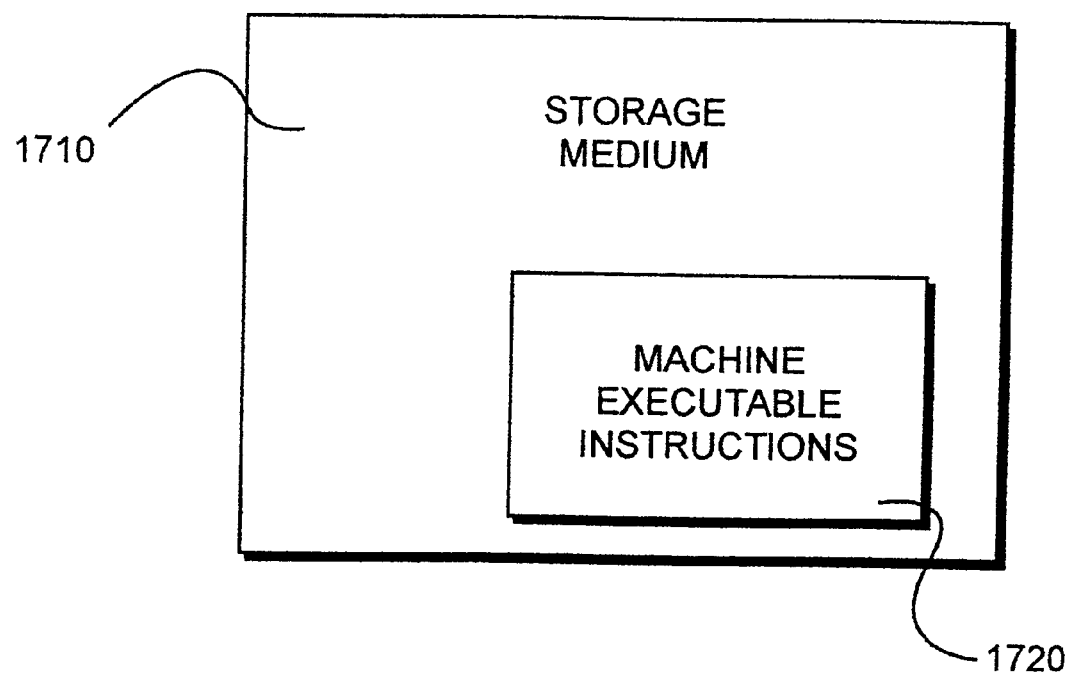
FIG. 17 illustrates a machine readable storage medium storing machine readable instructions to implement one embodiment of the present invention.

Acid trap remover 120, as shown in FIGS. 1 and 2, can be executed by processor 1610 as a series or sequence of instructions or function calls stored, for instance, in permanent memory 1620 or temporary memory 1660. Alternately, as shown in FIG. 17, machine executable instructions 1720 representing acid trap remover 120 could be stored on distribution storage medium 1710, such as a CD ROM, a digital video or versatile disk (DVD), or a magnetic storage medium like a floppy disk or tape. The instructions could also be downloaded from a local or remote server.

Alternately, the present invention could be implemented in hardware. For instance, one or more ASICs (application specific integrated circuits) could be endowed with some or all of the functionality of acid trap remover 120, and inserted into system 1600 of FIG. 16 as separate components, or combined with one or more other components.

Thus, a method and apparatus for automatically removing acid traps from a hatched fill in a printed circuit board design is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method to design printed circuit boards, the method comprising:

receiving design data representing a printed circuit board design; and automatically modifying the printed circuit board design to fill partial hatch areas in a cross-hatched fill area in the printed circuit board design, said cross-hatched fill area comprising boundary lines and cross hatched lines within the boundary lines, said boundary lines and cross-hatched lines having a particular aperture.

2. The method of claim 1 wherein the automatically modifying comprises:

converting the cross-hatched fill area into a bit map of one dimensional edges, said edges representing the boundary lines .and cross-hatched lines;

identifying the partial hatch areas in the bit map of edges;

adding edges in the partial hatch areas; and converting the added edges into fill lines in the printed circuit board design, said fill lines having the particular aperture.

3. The method of claim 2, wherein the converting the cross-hatched fill area into the bit map of edges comprises:

creating boundary edges in the bit map representing the boundary lines of the cross-hatched fill area in the printed circuit board design, said boundary edges comprising at least one polygon; and creating a cross-hatched contour of edges in the bit map representing the cross-hatched lines of the cross-hatched fill area in the printed circuit board design.

4. The method of claim 2 wherein the identifying the partial hatch areas in the bit map of edges comprises:

determining a number of unit length intersecting segments at each intersection of a cross-hatched contour of edges in the bit map, wherein areas surrounding the intersecting segments inside the boundary edges comprise the partial hatch areas if the number is less than four.

5. The method of claim 2 wherein the adding edges in the partial hatch areas comprises:

shortening segments of a cross-hatched contour of edges at each intersection of the cross-hatched contour of edges and boundary edges in the bit map where the cross-hatched contour of edges extends into the partial hatch areas;

isolating a set of edges in a first coordinate direction of the cross-hatched contour of edges, wherein said set of isolated edges border the partial hatch areas;

sweeping the isolated edges and the boundary edges in a second coordinate direction in parallel sweeps, said parallel sweeps spaced at particular intervals in the first coordinate direction; and generating edges along the parallel sweeps to fill the partial hatch areas according to a set of employment rules.

6. The method of claim 5 wherein the set of employment rules comprise:

obtaining coordinates for each intersection of a particular parallel sweep, each intersection comprising at least one of a particular boundary edge and a particular isolated edge of the set of isolated edges, said intersections defining fill segments between exclusive pairs of intersections, starting from a first intersection with a first encountered boundary edge along a given parallel sweep; and determining a length of each fill segment, wherein an edge is generated along each fill segment between a respective exclusive pair of intersections if the fill segment has a length greater than the particular aperture of a line.

7. The method of claim 5 wherein the particular intervals are equal to the particular aperture of a line.

8. The method of claim 1 wherein the partial hatch areas comprise irregular hatch openings.

9. A machine-readable storage medium having stored thereon machine-readable instructions, the execution of said machine-readable instructions to implement a method to design printed circuit boards, the method comprising:

receiving design data representing a printed circuit board design; and automatically modifying the printed circuit board design to fill partial hatch areas in a cross-hatched fill area in the printed circuit board design, said cross-hatched fill area comprising boundary lines and crosshatched lines within the boundary lines, said boundary lines and cross-hatched lines having a particular aperture.

10. The machine readable storage medium of claim 9 wherein the automatically modifying comprises:

converting the cross-hatched fill area into a bit map of one dimensional edges, said edges representing the boundary lines and cross-hatched lines;

identifying the partial hatch areas in the bit map of edges;

adding edges in the partial hatch areas; and converting the added edges into fill lines in the printed circuit board design, said fill lines having the particular aperture.

11. The machine readable storage medium of claim 10, wherein the converting the cross-hatched fill area into the bit map of edges comprises:

creating boundary edges in the bit map representing the boundary lines of the cross-hatched fill area in the printed circuit board design, said boundary edges comprising at least one polygon; and creating a cross-hatched contour of edges in the bit map representing the cross-hatched lines of the cross-hatched fill area in the printed circuit board design.

12. The machine readable storage medium of claim 10 wherein the identifying the partial hatch areas in the bit map of edges comprises:

determining a number of unit length intersecting segments at each intersection of a cross-hatched contour of edges in the bit map, wherein areas surrounding the intersecting segments inside the boundary edges comprise the partial hatch areas if the number is less than four.

13. The machine readable storage medium of claim 10 wherein the adding edges in the partial hatch areas comprises:

shortening segments of a cross-hatched contour of edges at each intersection of the cross-hatched contour of edges and boundary edges in the bit map where the cross-hatched contour of edges extends into the partial hatch areas;

isolating a set of edges in a first coordinate direction of the cross-hatched contour of edges, wherein said set of isolated edges border the partial hatch areas;

sweeping the isolated edges and the boundary edges in a second coordinate direction in parallel sweeps, said parallel sweeps spaced at particular intervals in the first coordinate direction; and generating edges along the parallel sweeps to fill the partial hatch areas according to a set of employment rules.

14. The machine readable storage medium of claim 13 wherein the set of employment rules comprise:

obtaining coordinates for each intersection of a particular parallel sweep, each intersection comprising at least one of a particular boundary edge and a particular isolated edge of the set of isolated edges, said intersections defining fill segments between exclusive pairs of intersections, starting from a first intersection with a first encountered boundary edge along a given parallel sweep; and determining a length of each fill segment, wherein an edge is generated along each fill segment between a respective exclusive pair of intersections if the fill segment has a length greater than the particular aperture of a line.

15. The machine readable storage medium of claim 13 wherein the particular intervals are equal to the particular aperture of a line.

16. The machine readable storage medium of claim 9 wherein the partial hatch areas comprise irregular hatch openings.

17. An apparatus to design printed circuit boards, the apparatus comprising:

an acid trap remover to receive design data representing a printed circuit board design and automatically modify the printed circuit board design to fill partial fill areas in a cross-hatched fill area In the printed circuit board design, said cross-hatched fill area comprising boundary lines and cross-hatched lines within the boundary lines, said boundary lines and cross-hatched lines having a particular aperture.

18. The apparatus of claim 17 wherein the acid trap remover comprises:

a bit map generator to convert the cross-hatched fill area into a bit map of one dimensional edges, said edges representing the boundary lines and cross-hatched lines;

a partial hatch locator to identify the partial hatch areas in the bit map of edges;

an edge generator to add edges in the partial hatch areas; and an edge converter to convert the added edges into fill lines in the printed circuit board design, said fill lines having the particular aperture.

19. The apparatus of claim 18 wherein the bit map generator comprises:

a boundary generator to create boundary edges in the bit map representing the boundary lines of the cross-hatched fill area in the printed circuit board design, said boundary edges comprising at least one polygon; and a contour generator to create a cross-hatched contour of edges in the bit map representing the cross-hatched lines of the cross-hatched fill are in the printed circuit board design.

20. The apparatus of claim 18 wherein the partial hatch locator comprises:

a circuitry to determine the number of unit length intersecting segments at each intersection of a cross-hatched contour of edges in the bit map, wherein areas surrounding the intersecting segments inside the boundary edges comprise the partial hatch areas if the number is less than four.

21. The apparatus of claim 18 wherein the edge generator comprises:

a first circuitry to shorten segments of a cross-hatched contour of edges at each intersection of the cross-hatched contour of edges and boundary edges in the bit map where the cross-hatched contour of segments extends into the partial hatch areas;

a second circuitry to isolate a set of edges in a first coordinate direction of the cross-hatched contour of edges, wherein said set of isolated edges border the partial hatch areas;

a third circuitry to sweep the isolated edges and the boundary edges in a second coordinate direction in parallel sweeps, said parallel sweeps spaced at particular intervals in the first coordinate direction; and a fourth circuitry to generate edges along the parallel sweeps to fill the partial hatch areas according to a set of employment rules.

22. The apparatus of claim 21 wherein the set of employment rules comprise:

obtaining coordinates for each intersection of a particular parallel sweep, each intersection comprising at least one of a particular boundary edge and a particular isolated edge of the set of isolated edges, said intersections defining fill segments between exclusive pairs of intersections, starting from a first intersection with a first encountered boundary edge along a given parallel sweep; and determining a length of each fill segment, wherein an edge is generated along each fill segment between a respective exclusive pair of intersections if the fill segment has a length greater than the particular aperture of a line.

23. The apparatus of claim 21 wherein the particular intervals are equal to the particular aperture of a line.

24. The apparatus of claim 17 wherein the partial hatch areas comprise irregular hatch openings.

\* \* \* \* \*

UNITED STATES PATENT AND TRADEMARK OFFICE
CERTIFICATE OF CORRECTION

PATENT NO. : 6,192,509 B1
DATED : February 20, 2001
INVENTOR(S) : Nataraj Akkiraju It is certified that error appears in the above-identified patent and that said Letters Patent is hereby corrected as shown below:

Column 8,
Line 23, "cross hatched lines" should read -- cross-hatched lines --.

Column 10,
Line 43, "area In the" should read -- area in the --.

Signed and Sealed this

Fifth Day of March, 2002

Attest:

Attesting Officer

JAMES E. ROGAN
Director of the United States Patent and Trademark Office